United States Patent [19]

Filauro et al.

[11] Patent Number: 4,673,804

[45] Date of Patent: Jun. 16, 1987

[54] ELECTRONIC GRAPHIC DETECTING HEAD

[75] Inventors: Paolo Filauro; Giorgio Musso, both of Genoa, Italy

[73] Assignee: Elettronica San Giorgio - ELSAG S.p.A., Genova-Sestri, Italy

[21] Appl. No.: 709,074

[22] Filed: Mar. 7, 1985

[30] Foreign Application Priority Data

Mar. 9, 1984 [IT] Italy ................. 67222 A/84

[51] Int. Cl.$^4$ ............................. G06K 7/10
[52] U.S. Cl. .................... 235/463; 235/462; 235/470; 235/472
[58] Field of Search ............... 235/462, 463, 470, 472

[56] References Cited

U.S. PATENT DOCUMENTS

| | | | |
|---|---|---|---|
| 3,801,775 | 4/1974 | Acker | 235/470 |
| 4,160,156 | 7/1979 | Sherer | 235/472 |
| 4,323,772 | 4/1982 | Serge | 235/463 |
| 4,411,016 | 10/1983 | Wakeland | 235/463 |
| 4,465,926 | 8/1984 | Apitz | 235/472 |

Primary Examiner—Harold I. Pitts
Attorney, Agent, or Firm—Gifford, Groh, VanOphem, Sheridan, Sprinkle and Dolgorukov

[57] ABSTRACT

Electronic graphic detecting head includes lamps for lighting a zone in which the said graphics may be presented, lenses for focusing on a detecting means designed to convert light signals into electric analogue signals and circuitry designed to supply a digital conversion of the said analogue signals. The main characteristic of the said electronic head consists in a first threshold-generating block designed to supply a comparator block with a first signal depending on the reflection of a support (3) bearing the said graphics, and a second block for intensifying the difference in value of the said analogue signal from successively-scanning elements on the said detecting means and designed to supply a second signal to the comparator block which supplies a third digital output signal representing the said graphics.

19 Claims, 6 Drawing Figures

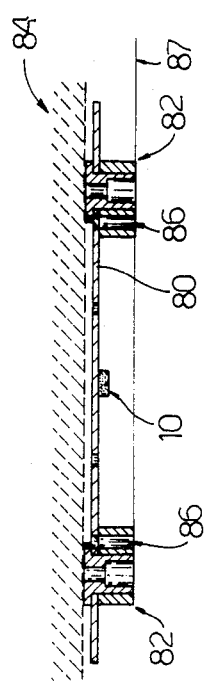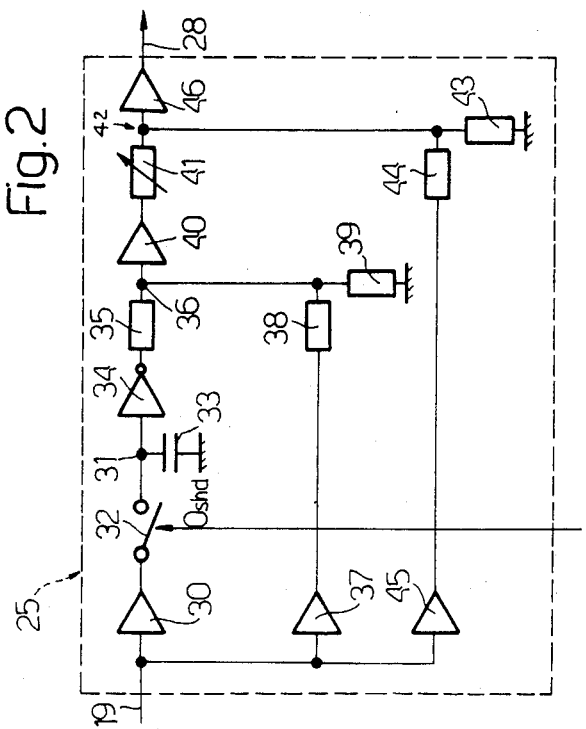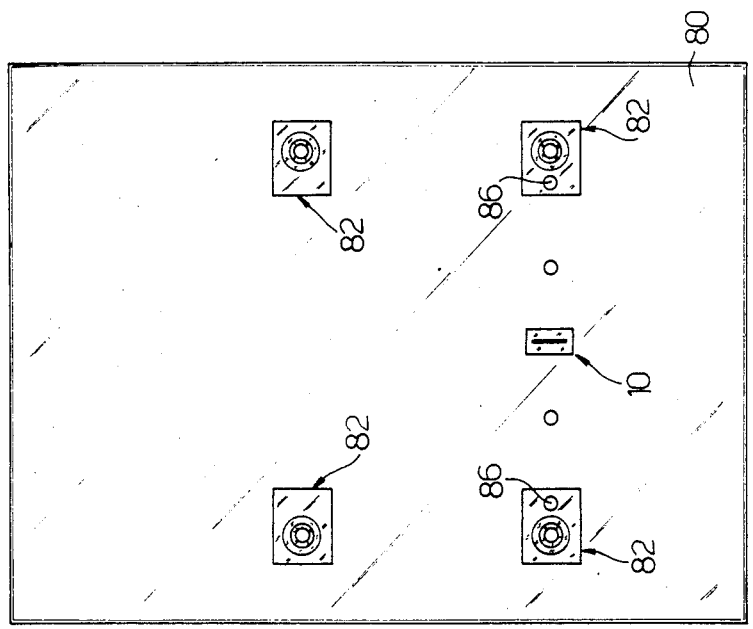

ELECTRONIC GRAPHIC DETECTING HEAD

BACKGROUND OF THE INVENTION

The present invention relates to an electronic head for detecting all types of printed or stamped graphics, in particular, mailing address bar codes.

Electronic heads for detecting graphics, particularly mailing address codes, are already known and comprise a system of optical-electronic equipment designed for transducing graphics photoelectrically and comprising means for lighting a zone (usually a slit on a screen) over which are presented the said graphics (usually on an envelope passed in front of the said slit), and means for focusing on detecting means (usually comprising photodiodes) designed to convert light signals into electric analogue signals. The said equipment therefore comprises means for supplying analogue signals converted into digital signals comprising digital data at logic level 1 or 0 suitable for further processing, e.g. by a characterreading system. The said digital data depends on each point within the scanned field being assigned black or white status by the components on the electronic head, the said status being assigned by the electronic head according to a specific algorithm characteristic of each set of equipment.

SUMMARY OF THE INVENTION

The aim of the present invention is to provide an electronic head of the aforementioned type involving particularly straightforward circuitry, and consequently low cost, and which, at the same time, provides for good reliability, easy setting and a compact, self-contained structure easily connected to the transfer sections on automatic mail sorting lines.

With this aim in view, the present invention relates to an electronic graphic detecting head comprising means for lighting a zone in which the said graphics may be presented, means for focusing on detecting means designed to convert light signals into electric analogue signals, and means designed to supply a digital conversion of the said analogue signals, characterised by the fact that the said means comprise a first threshold-generating block, designed to supply a comparator block with a first signal depending on the reflection of a support bearing the said graphics, and a second block for intensifying the difference in value of the said analogue signal from successively-scanning elements on the said detecting means, and designed to supply a second signal to the said comparator block which supplies a third digital output signal representing the said graphics.

BRIEF DESCRIPTION OF THE DRAWINGS

A non-limiting arrangement of the present invention will now be described with reference to the attached drawings in which:

FIG. 2 shows a more detailed circuit diagram of a block on the FIG. 1 electronic head;

FIGS. 5 and 6 show front and top sections respectively of a component on the electronic head in FIGS. 3 and 4.

DETAILED DESCRIPTION OF THE INVENTION

Figure 1:
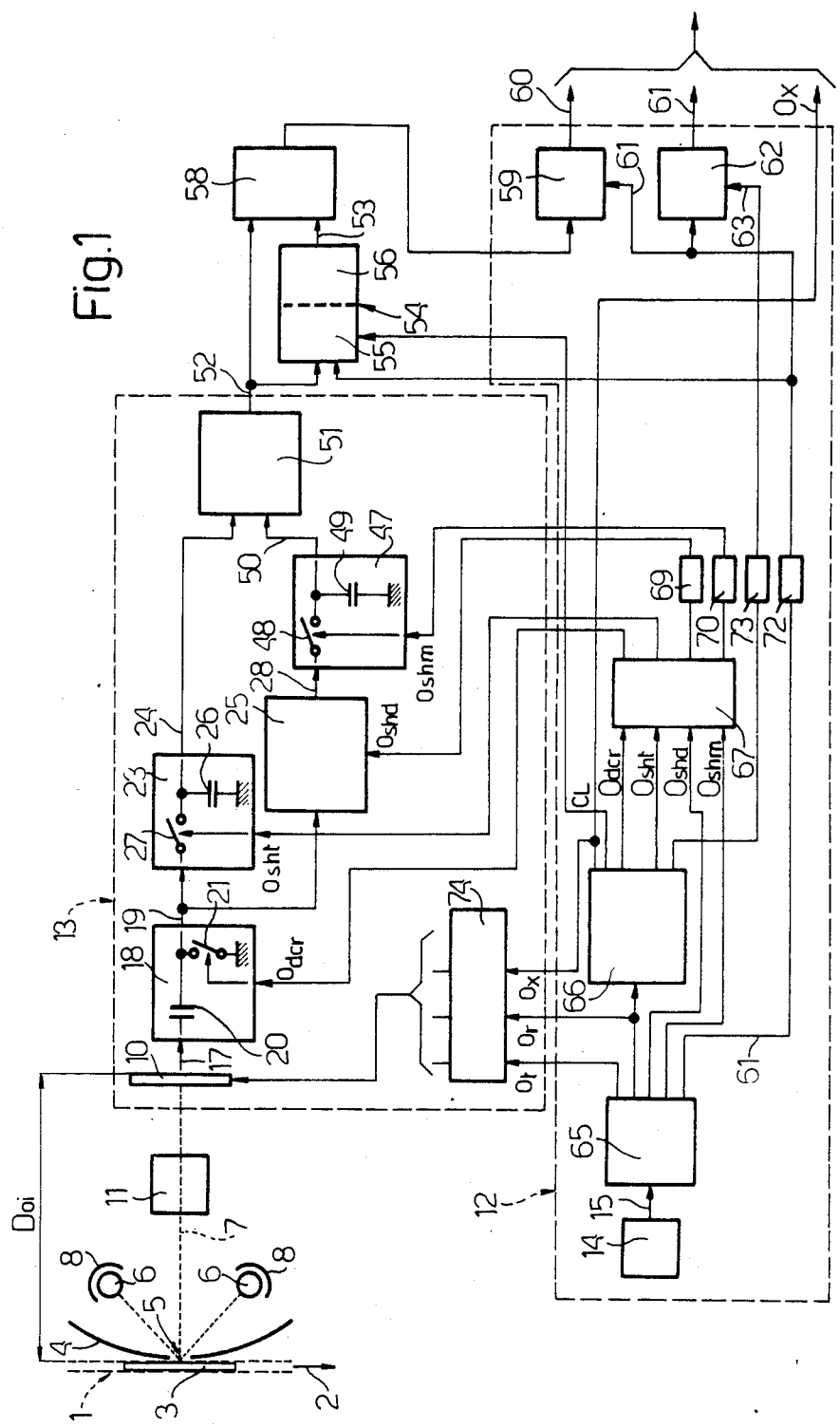
FIG. 1 shows a block diagram of the electronic head according to the present invention.

The dotted line marked 1 in FIG. 1 indicates a channel along which an object 3 stamped with the graphics for detection is run in direction 2. As described later on, the object 3 may conveniently be an envelope or a postcard. Opposite channel 1, is fitted a screen 4 having a centre slit 5 defining a reading area on object 3. The said slit 5 is conveniently sized for scanning a reading area 30 mm high and 250 micron wide. Slit 5 is lighted by two halogen lamps 6 on opposite sides of an optical axis 7 perpendicular to object 3, the said lamps 6 being conveniently supplied with 11 V a.c. voltage and supplying a total of roughly 90 W a high percentage of which is directed on to slit 5 by two mirrors 8 behind lamps 6. The latter are series-connected so that a breakdown on one also causes the other to go off, thus enabling the breakdown to be detected immediately.

The image picked up through slit 5 is focused on to a detecting unit 10 by an optical unit 11 which reduces the height of slit 5 (e.g. 30 mm) to that of detecting unit 10 (e.g. 1.6 mm), making a reduction factor of about 1/18. For minimising the overall size of the mechanical components on the detecting head, optical unit 11 is conveniently fitted with a lens having a focal length of 5.5 mm and an adjustable diaphragm aperture (conveniently set to 1.6) and of a type readily available on the market and suitable for use on telecameras. Therefore, given a distance of 25 mm (Dpp) between the principal planes on the said lens, an enlargement factor (I) of 18.54 and a focal length (F) of 5.5, the distance between object 3 and detecting unit 10 (Doi) will equal:

$$Doi = 2F + F/I + F \times I + Dpp =$$
$$11 + 5.5:18.54 + 5.5 \times 18.54 + 25 \times 141 \text{ mm}.$$

Another important factor is the field depth : taking into account the aperture of the diaphragm, the size of the diodes on detecting unit 10 and the image reducing factor, the field depth on the said detecting head works out at ±3 mm.

The electronic part of the detecting head according to the present invention comprises two main logic modules, 12 and 13, the first for generating the timing required for correct operation of the head and for sending the collected data to successive processing or user means, and the second for acquiring and preprocessing the video signals detected by detecting unit 10.

Timing and transmission module 12 comprises an oscillating block 14 the frequency of which may be regulated by means of a potentiometer and must be set according to the travelling speed (meters/second) of object 3 and required horizontal image smapling (points/mm). The relationship between the oscillating cycle on oscillator 14 and the aforementioned two parameters is the following:

$$T \, osc = (1:648) \times (1:V) \times (1:R) \text{ meters per second.}$$

If, for example, V=3.25 m/sec and R=8 points/mm, Tosc will equal 59.3 n sec.

Oscillating block 14 therefore supplies a main timing signal 15 which is then appropriately divided and adapted for generating the various sync signals as described later on. Detecting unit 10 is a known type, conveniently a Texas Instrument TC 102, based on CCD technology and employing a series of photodiodes for converting light energy into electric charges and an analogue side register for transferring the said charges to the outside. The said series of photodiodes is linear, consisting of 128 elements, each 12.7×12.7 micron in size (each corresponding to a pixel), plus a number of darkened elements to give a shade of "black" relative to the component that particular diode belongs to and which varies from one component to another, plus a number of separating elements. The total number of active and non-active "cells" on the detector is 161 which is also the number of cycles on a conveniently square-wave sync signal ($O_r$) generated for each complete scan of a video column: given the aforementioned sampling and object 3 speed parameters, a complete column scan requires 38.46 microseconds. Output signal 17 on detecting unit 10 is affected by a continuous component of about +8 V and is maximum in the presence of "black" and minimum in the presence of maximum lighting. The said output signal 17 is sent to a circuit block 18 the function of which is to eliminate the continuous component on the said output signal 17, thus enabling successive blocks to operate on video signal levels based on 0 Volts, instead of on the roughly 8 Volts on the carrier from detecting unit 10. The said circuit block 18 therefore supplies an output signal 19 the "black" level of which (obtained using the darkened reference "cells" on detecting unit 10) coincides with a voltage level of 0 Volts, whereas the "grey" to "white" levels, the latter corresponding to maximum lighting, coincide with voltages ranging roughly from 0 to −1.2 Volts. The said circuit block 18 essentially comprises a condenser 20 series-connected to the signal 17 line downstream from which is grounder ananalogue switch 21 controlled by a sync signal $O_{dor}$ for resetting operation of the said block 18.

Output signal 19 is then sent back both to a circuit block 23, for generating a reference threshold signal 24, and to a circuit block 25 the function of which is to intensify the difference in value of analogue signal 19 from successively-scanning photodiode elements on detecting unit 10. Circuit block 23 mainly comprises a condenser 26 branch-connected to the signal line to which, upstream from the said branch connection of condenser 26, is series-connected an analogue switch 27 controlled by a sync signal $O_{sht}$.

Circuit block 25 is shown in greater detail in FIG. 2 and operates according to the following algorithm:

$$P_i^* = (P_i - P_{i-1})k + P_i$$

in which:
P$_i$=the value of analogue signal 19 relative to the scanning of photosensor element i; ·
P$_{i-1}$=the value of analogue signal 19 relative to the scanning of photosensor element i−1; and
P$_i^*$=the value of analogue output signal 28 from circuit block 25 corresponding to the input of analogue signal 19 corresponding to photodiode i.

Signal 19 is sent to a unit amplifier 30 the output of which is connected to a node 31 by a analogue switch 32 controlled by a sync signal $O_{shd}$ (at photosensor element scanning frequency). Node 31 is grounded via condenser 33 and connected to the input of inverter 34 the output of which is connected, via resistor 35, to node 26. Signal 19 is also sent to the input of another unit amplifier 37 the output of which is connected, via resistor 38, to node 36 and grounded via resistor 39. Via unit amplifier 40 and potentiometer 41 regulating constant k in the aforementioned algorithm, node 36 is connected to node 42 which is also grounded, via resistor 43, and connected, via resistor 44, to the output of unit amplifier 45 the input of which receives signal 19. Node 42 is connected to the input of amplifier 46 from the output of which is picked up signal 28.

The algorithm used in block 25 therefore refers to the derivative and operates on the values of signal 19 relative to two successively-scanning photodiodes on detecting unit 10: the level of signal 19 for photodiode i is memorised in that it is kept on condenser 33, by means of analogue switch 32. This value, inverted by inverter 34, is added in node 36 to the value of signal 19 corresponding to photodiode i, the resulting value of which, plus a factor set by potentiometer 41, is further added in node 42 to the value of signal 19 for photodiode i, so as to give the value of analogue signal 28 sent to a successive circuit block 47 (FIG. 1) which provides for sampling signal 28 at a given time set by sync signal $O_{shm}$ (similar to signal $O_{shd}$ but separated in time) controlling an analogue switch 48 series-connected to the signal line and upstream from a condenser 49 branch-connected to ground. The said block 47 therefore supplies an output signal 50 which is sent to the input of a high-speed comparator 51 the other input of which receives reference threshold signal 24. The said comparator 51 may conveniently be provided at the input with a hysteresis circuit and supplies digital output signal 52.

The said digital signal 52 is sent to a filter block 54 comprising a parallel register 55 the seven outputs of which are connected to a PROM memory 56 which provides for numerical filtering of input signal 52 by applying an algorithm eliminating digital signals at logic level 1 (corresponding to graphics) and isolated from digital signals from previously- or subsequently-scanning photosensor elements. In the specific case of applying the said electronic head for detecting mailing address bar codes, this amounts to filtering all the digital logic data sequences on signal 52 that are less than four connected in line, i.e. each digital datum corresponding to a graphic sign in the filtered sequence only remains unchanged (i.e. at logic level 1) if it is connected to another three digital data corresponding to graphic signs (i.e. at logic level 1). If the generic sequence of logic levels 0 and 1 at the input of block 54 is defined X=(X$_i$ i=1,n), and the filtered sequence at the output of block 54 is defined Y (Y$_i$ i=1,n), the generic digital datum Y$_i$ will be according to the following logic equation (AND-OR):

$$Y_i = X_{i-3} \cdot X_{i-2} \cdot X_{i-1} \cdot X_i + X_{i-2} \cdot X_{i-1} \cdot X_i \cdot X_{i+1} + X_{i-1} \cdot X_i \cdot X_{i+1} \cdot X_{i+2} + X_i \cdot X_{i+1} \cdot X_{i+2} \cdot X_{i+3}$$

The block 54 algorithm therefore operates on six digital data, from the top and bottom three photosensor elements relative to the image column, round the element being calculated. According to the present configuration, the digital datum from the photosensor element in question is considered "black" or "white" by the output of PROM memory 56 programmed according to the said filtering algorithm. The said digital output datum 53 isthen sent to selector 58 which also receives digital signal 52 directly from comparator 51 and selects whether or not to send the digital datum filtered by block 54 to block 59 transmitting video datum 60 and controlled by sync and enabling signal 61. The latter is also sent to block 54 and a transmitter 62, controlled by enabling signal 63, for supplying subsequent equipment exclusively with signals 61 confirming video datum 60 and relative to the photodiodes on detector unit 10 supplying svalid grphic pick-up data. Subsequent processing equipment is therefor supplied, over a differential line for withstanding even long distances, with: video data signal 60, datum 60 sync and enabling signal 61 and signal $O_x$ indicating scanning start of a new column by detecting unit 10.

With reference to logic module 12 in FIG. 1, the main timing signal 15 is sent to a dividing block 65 the output of which supplies signal 61, signal $O_t$ for shifting the register on detecting unit 10, signal $O_r$ for zeroing the output register on detecting unit 10 (coinciding with the scanning frequency of the photodiodes on the said detecting unit 10) and signals $O_{shd}$ and $O_{shm}$ which are sent respectively to block 25 and block 47, as already stated, via level adapting block 67 and via two respective digital delay lines 69 and 70, which provide for shifting, on the time axis, the point at which the said two sync signals are activated, in such a manner as to adapt timing to the retarded data flow on detecting unit 10 and connected components. Signal $O_r$ is also sent to a dividing block 66 comprising a binary counter and decoding PROM, and which generates the other sync signals: signals $O_{sht}$ and $O_{dcr}$ sent via level adapting block 67 to block 23 and block 18 respectively; signal $O_x$ which is also sent to detecting unit 10 and controls signal transfer from the photodiodes to the shift register on detector 10 (besides indicating scanning commencement of a new video column); signal C1 sent to filtering block 54 and which provides for masking a number of photodiode output signals from detecting unit 10 and for eliminating any edge effects on the detector; and signal 63 for enabling transmitter 62. For signals 61 and 63, provision has been made for two delay lines, 72 and 73 respectively, for activating enabling signal 61 at the appropriate time in relation to the presence of a valid datum 60, and so provide for transmission to subsequent equipment. Sync signals $O_t$, $O_r$ and $O_x$, required for operation of detecting unit 10 and generated by timing module 12, have typical TTL logic voltage levels. As detecting unit 10 is based on CCD logic requiring different levels, logic level 0 having a voltage of 16 V, the signals on the said unit are sent through a level adapter 74. Module 12 therefore comprises a section (not shown) for generating a number of auxiliary voltages for operating various circuit blocks described.

Figure 3:
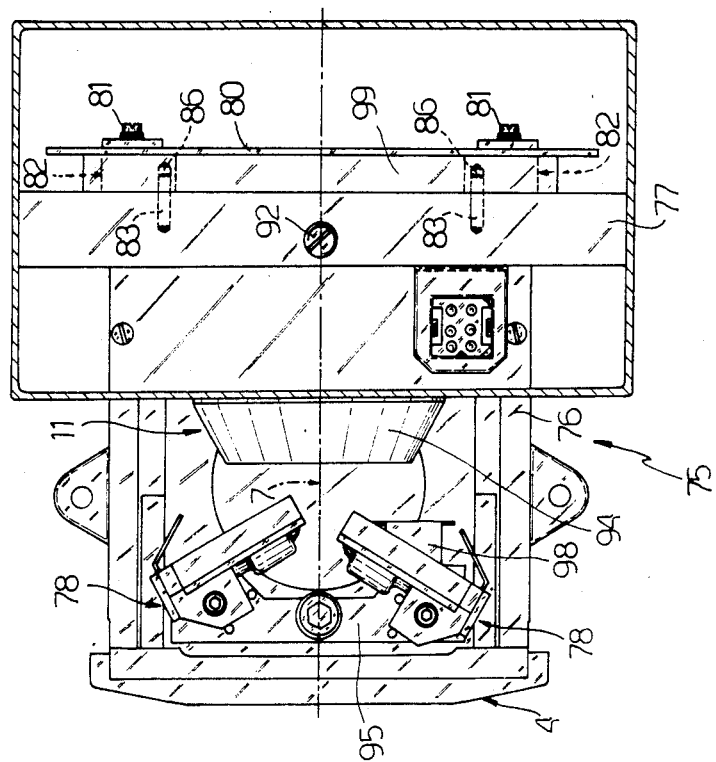
FIGS. 3 and 4 show partial top and side sectiosn respectively of major mechanical parts on the electronic head according to the present invention.
Figure 4:
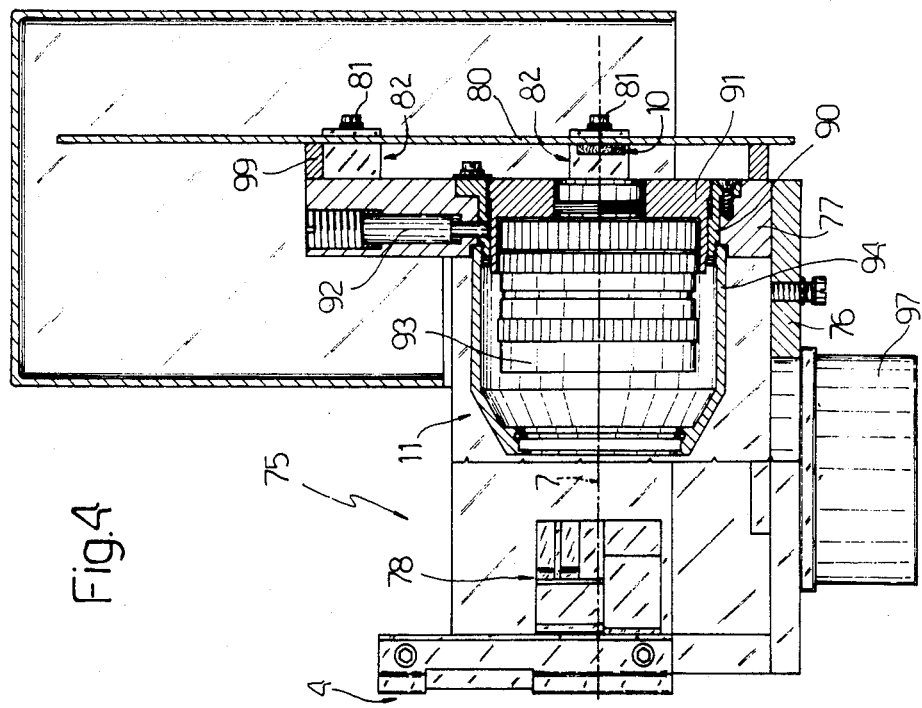

FIGS. 3 and 4 show the mechanical arrangement of optical unit 11, detecting unit 10, lamp unit 6, screen 4 and the relative supporting structure. The latter, numbered as a whole by 75, presents a supporting base plate 76 fitted, by mans of perpendicular plate 77, with optical unit 11. In more detail, plate 77 is fitted with a bush 90 threaded internally and housing a body 91, the latter being axially adjustable, locked by screw 92 and fitted with a lens 93 surrounded by cover 94. At the front of the said unit 11, two units 78 are fitted on to base plate 76, by means of intermediate supporting body 95, for supporting lamps 6 and respective reflectors 8. Again at the front, by means of an intermediate support on base plate 76, is fitted screen 4 conveniently ceramic-coated for defining slit 5 in relation to which object 3 is positioned and read. A fan 97 is fitted beneath units 78 for lamps 6, so as to maintain an acceptable temperature inside the reading head despite lamps 6 and the compact structure 75. The fan is supplied directly by the transformer supplying lamps 6, and a thermostat 98 with an operating threshold of 45° C. is series-connected to the lamps - the major source of heat on the reading head - for turning the lamps off in the event of overheating resulting from a breakdown on fan 97. Detecting unit 10 is set up behind optical uit 11 and palte 77, on optical axis 7 of unit 11. As shown also in FIGS. 5 and 6, the said detecting unit 10 is fitted on to a supporting board 80 secured to plate 77 by screws 81 inserted inside four spacing blocks 82, two of which are provided with two centering pins 83 with a seal 99 in between. As described in more detail later on, no adjustment is requied during assembly for positioning detector unit 10 in relation to optical axis 7 on optical unit 11: a series of preliminary operations carried out on board 80 (conveniently fitted with logic module 13) provides for correct positioning of detecting unit 10 by simply assembling board 80 in the housing defined by pins 83. In fact, as shown in FIG. 6, once spacing blocks 82 (formed in two parts) have been bonded onto board 80, the said blocks 82 are screwed onto a flat locating surface 84. The outer surface of photosensor 10 is then set perpendicular to the vertical operating axis, preferably by means of an optical focusing difference, with reference to the photodiode line, i.e. the black line inside the photosensor. The photodiode line is then set parallel to the horizontal operating axis and the centre line sought on the photodiode line. Two holes 86 are then formed in two spacing blocks 82 for positioning the two pins 83,after which, the four spacing blocks 82 are levelled off to plane 87.

All these operations are therefore based on detecting unit 10 itself (and therefore specific for each board 80) which thus constitutes the central point on the entire head. Once the said operations have been completed, the said board 80 is simply connected to supporting plate 77 using centering pins 83 and screws 81, for centering detecting unit 10 directly on the optical axis 7.

The electronic detecting head according to the present invention operates as follows.

Suppose object 3 is conveniently stamped with parallel bars in characteristic sequences and relative to mailing address codes. The said bar may conveniently be stamped on object 3 in an area measuring 128×30 mm and located parallel with the edges on the code support, 5 mm from the bottom edge. Reflection on object 3 is conveniently of over 0.6 with a minimum PCR (print contrast ratio) of 0.3.

The graphic detecting area on object 3, defined by slit 5, is lighted up by lamps 6, focused onto detecting unit 10 and swept at each scanning cycle of the latter. Object 3 is passed in front of slit 5 and scanned by a sufficiently high number of cycles by detecting unit 10 to ensure acquisition of the entire reading area on the said object 3. As already stated, the image is focused on to detecting unit 10 by optical unit 11, distance $D_{oi}$ (FIG. 1) being determined so as to provide the reduction factor required by the size of the reading area on slit 5 and the size of detecting unit 10. The data contained in the optical beam picked up by detecting unit 10 is converted into electrical analogue signal 17 affected by a continuous component of roughly +8 Volts. The level of the said signal 17 is maximum in the presence of "black" and minimum in the presence of maximum lighting of the photodiodes on detecting unit 10. Block 18 then eliminates the continuous component on signal 17 to produce signal 19 the "black" level of which coincides with a voltage of 0 Volts.

For digitalizing signal 19, a reference signal must be generated which, when compared with the former, provides for determining whether the digital output signal 52 from comparator 51 is to be "white" (logic 0)

or "black" (logic 1). Such a reference signal, which acts as a discriminating threshold in the real sense of the word, is generated by circuit block 23 which, via sync signal O_{sht}, memroises, within a given video column scan, the minimum voltage level of signal 19 supplied by detecting unit 10 during the said scanning operation, the said minimum level corresponding to the maximum reflection (i.e. whitest) point on the scanned area. The said voltage level so obtained is then used for generating threshold signal 24 itself, obtained downstream from a resistive divider enabling its adjustment: by so doing, the digitalizing reference signal is adapted automatically to the background on object 3 on which the code is stamped, as well as to any variation in reflection caused by differences or defects in the material employed (more or less reflecting paper) or by fluctuating lighting (mainly caused by the a.c. supply of lamps 6).

Video signal 19, cleared of its continuous component, is also sent to block 25 the function of which is to accentuate the "white"-"black" transition (or vice versa) encountered when a less reflecting symbol than the background moves in or out of the area analysed by detecting unit 10. This provides for improving the shape parameters, for example, of the code bars, by making the transition from "white" to "black" or vice versa clearer. The effect of the additional value $(P_i - P_{i-1})$ on the final result may be adjusted, as already stated, by means of potentiometer 41 which produces a signal differing widely from the starting signal, though with no loss in the intensity of the more interesting characteristics. The next block 47 provides for sampling signal 28 from transitionintensifying block 25 by means of sync signal $O_{shm}$ which memorises the level of the mid point on the pertinent interval of the Pixel i (photodiode) signal, thus eliminating any spurious data (especially that produced when resetting the output amplifier on detecting unit 10), so as to produce as "clean" a signal as possible. This is then sent directly to comparator block 51 which, by means of reference threshold signal 24, supplies an output signal 52 comprising a number of digital data which, after possibly going through filtering block 54, are transmitted, together with sync signals 61 and $O_x$, to subsequent processing equipment.

The advantages of the electronic reading head according to the present invention will be clear from the foregoing description. In particular, it provides for a relatively straightforward, low-cost, good-performance module, as compact and self-contained as possible, and containing everything required for ensuring optimum lighting of the reading area, focusing the image appropriately on an optical detector, acquiring the said image by converting light energy into electricl signals, processing the said signals for intensifying certain characteristics, digitalizing the said signals and sending the same to subsequent equipment with the synchronization required for ensuring efficient data exchange. The said module is compact enought to be housed in a self-contained structure 75 (FIGS. 3 and 4) which may easily be set up anywhere as required, e.g. on the transfer sections of automatic mail sorting lines. The present invention also provides, as described, for straightforward, accurate assembly of detecting unit 10 in relation to optical axis 7.

Notwithstanding the employment of relatively simple circuit component blocks, digital signal 52 provides for sufficiently accurate identification of the graphics on object 3, thanks to the characteristics of circuit block 25 intensifying the transition from "white" to "black" and vice versa, and thanks to circuit block 23 generating a reference threshold varying according to the characteristics of the background on object 3. Filter block 54 may be employed or dispensed with as required, depending on the characteristics of the graphics being detected, and is especially useful when detecting vertical bars. The frequency of oscillator block 14, and therefore of the various sync signals described, may be varied, depending on the travelling speed of object 3 and the type of detection required.

To those skilled in the art it will be clear that changes can be made to the circuitry and arrangement of the electronic head as described herein, without, however, departing from the scope of the present invention.

For example, filter block 54 may be designed for an algorithm other than the one described herein.

What is claimed is:

1. Electronic graphic detecting head comprising means (6) for lighting a zone (5) in which the said graphics may be presented, means (11) for focusing on detecting means (10) designed to convert light signals into electric analogue signals (17), and means (23, 25, 47, 51) designed to supply a digital conversion of the said analogue signals (17), characterised by the fact that the said means comprise a first threshold-generating block (23), designed to supply a comparator block (51) with a first signal (24) depending on the reflection of a support (3) bearing the said graphics, and a second block (25) for intensifying the difference in the value of the said analogue signal (19) from successively-scanning element on the said detecting means (10), and designed to supply a second signal (28) to the said comparator block (51) which supplies a third digital output signal (52) representing the said graphics wherein said second block (25) comprises means for generating an output signal (P_i) representative of the magnitude $$P_i = (P_i - P_{i-1})k + P_i$$

where

P_i equals the value of the analogue signal (19);
i equals the scanning element on the detecting means (10); and
k equals a constant.

2. Electronic head according to claim 1, characterised by the fact that it comprises a block (47) for sampling the said second signal (28) at a present time by means of a sync signal ($O_{shm}$) for sending it to the said comparator block (51).

3. Electronic head according to claim 1, characterised by the fact that the said second block (25) comprises means (46, 40, 33) for adding the value of the said analogue signal (19) for an element scanning on the said detecting means (10) to the difference, according to a preset proportion constant, between the said value of the said signal (19) from the said element and the value of the said signal (19) from a previously-scanning element.

4. Electrnic head according to claim 3, characterised by the fact that the said value of the said signal (19) from a previous element is memorised by means of a condenser (33).

5. Electronic head according to claim 4, characterised by the fact that the said condenser (33) is supplied with the said signal (19) via switch means (32) closed at a preset time via a sync signal ($O_{shd}$).

6. Electronic head according to claim 1, characterised by the fact that the said first threshold-generating block (23) comprises a condenser (26) for detecting the maximum (absolute) value of the said signal (19) from the said detecting means (10) over a complete column scan, the said condenser (26) being supplied with the said signal (19) via switch means (27) controlled by a sync signal ($O_{sht}$).

7. Electronic head according to claim 1, characterised by the fact that the output of the said detecting means (10) is fitted with a block (18) for removing the continuous component from the said analogue signal (17).

8. Electronic head according to claim 1, characterised by the fact that it comprises means (54) for filtering the said third digital signal (52) from the said comparing block (51), the said filtering means (54) removing digital data (52) corresponding to graphics and isolated in relation to digital data (52) from previouslyand subsequently-scanning elements on the said detecting means (10).

9. Electronic head according to claim 8, characterised by the fact that the said filtering means (54) remove digital data (52) corresponding to graphics and unrelated to digital graphic data (52) from a preset number of sequentially-scanning elements on the said detecting means (10).

10. Electronic had according to claim 9, characterised by the fact that the said present number is three.

11. Electronic head according to claim 1, characterised by the fact that the said filtering means (54) comprise a parallel register block (55) and a PROM element (56).

12. Electronic had according to claim 8, characterised by the fact that it comprises selecting means (58) for disconnecting or not the said means (54) for filtering the said third digital signal (52).

13. Electronic head according to claim 1, characterised by the fact that the said third signal (60) and sync signals (61, $O_x$) may be sent to user means for processing and/or reproducing the said graphics.

14. Electronic head according to claim 1, characterised by the fact that the said sync signals ($O_{shm}$, $O_{shd}$, $O_{sht}$, $O_x$) are obtained, via dividing blocks (65, tt), from an oscillator (14) the frequency of which may be regulated according to the travelling speed of the said graphic support (3) past the said focusing means (11).

15. Electronic head according to claim 1, characterised by the fact that it comprises a board (80) for supporting the said detecting means (10) the position of which is set on the said board and recorded for forming two holes (86) for pins (83) locating the said board (80) in relation to the said focusing means (11), in such a manner as to centre the said detecting means (10) in relation to the said focusing means (11) and in relation to the said lighted area (5) in which the said graphics may be presented; the said board (80) being secured to the said focusing means (11) by means of supporting blocks (82) the height of which is machined after assembly on to the said board, so as to maintain the said centering of the said detecting means (10) even after assembly of the said board on to the said focusing means (11).

16. Electronic head according to claim 15, characterised by the fact that it comprises one element (76) for supporting the said focusing means (11), the said lighting means (6) and a screen (4), the latter defining the said lighted area (5) and the position of an object (3) bearing the said graphics.

17. Electronic head according to claim 1, characterised by the fact that the said lighting means (6) are supplied with a.c. voltage.

18. Electronic head according to claim 1, characterised by the fact that the said graphics consist of mailing address codes.

19. Electronic head according to claim 18, characterised by the fact that the said codes comprise a number of parallel bars in characteristic sequences.

* * * * *

UNITED STATES PATENT AND TRADEMARK OFFICE
CERTIFICATE OF CORRECTION

PATENT NO. : 4,673,804

DATED : June 16, 1987

INVENTOR(S) : Paolo Filauro and Giorgio Musso

It is certified that error appears in the above-identified patent and that said Letters Patent is hereby corrected as shown below:

Col. 1, line 64, delete "sectiosn" and insert --sections--.

Col. 2, line 54, delete "smapling" and insert --sampling--.

Col. 3, line 31, delete "grounder ananalogue" to --grounded an analogue--.

Col. 3, line 34, "back both" to read -- both --.

Col. 3, line 63, delete "26" and insert --36--.

Col. 4, line 51 after $X_i$ second occurrence, add --$X_{i+1}$--.

Col. 4, line 61, delete "isthen" and insert --is then--.

Col. 5, line 2, delete "svalid grphic" to --valid graphic--.

Col. 5, line 3, delete "therefor" and insert --therefore--.

Col. 6, line 3, delete "uit" and insert --unit--.

Col. 6, line 3, delete "palte" and insert --plate--.

Col. 7, line 4, delete "memroises" and insert --memorizes--.

UNITED STATES PATENT AND TRADEMARK OFFICE
CERTIFICATE OF CORRECTION

PATENT NO. : 4,673,804          Page 2 of 2

DATED : June 16, 1987

INVENTOR(S) : Paolo Filauro and Giorgio Musso

It is certified that error appears in the above-identified patent and that said Letters Patent is hereby corrected as shown below:

Page 2

Col. 8, line 47, delete "present" and insert --preset--.

Col. 8, line 54, delete "for" and insert --from--.

Col. 8, line 60, delete "Electrnic" and insert --Electronic--.

Col. 9, line 21, delete "previouslyand" and insert --previously- and--.

Col. 9, line 29, delete "had" and insert --head--.

Col. 9, line 36, delete "had" and insert --head--.

Col. 10, line 6, delete "65.tt" to --65, 66--.

Signed and Sealed this

Eighth Day of March, 1988

Attest:

DONALD J. QUIGG

*Attesting Officer*      *Commissioner of Patents and Trademarks*